June 24, 1930.  W. M. SHEEHAN  1,766,406
LOCOMOTIVE STRUCTURE
Filed Aug. 13, 1928  4 Sheets-Sheet 1
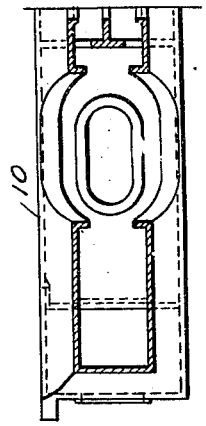
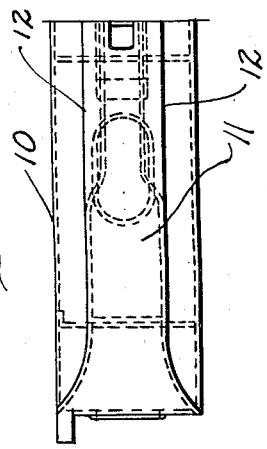
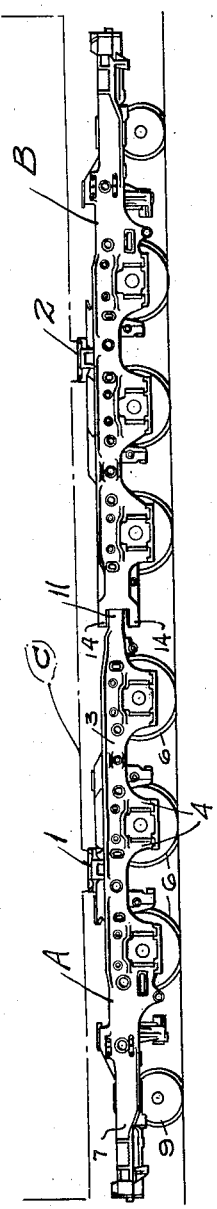
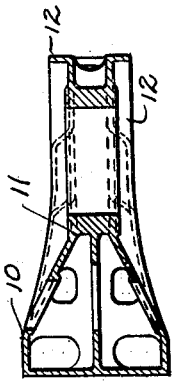
INVENTOR
William M. Sheehan
By Rodney Bedell
ATTORNEY June 24, 1930.  W. M. SHEEHAN  1,766,406
LOCOMOTIVE STRUCTURE
Filed Aug. 13, 1928  4 Sheets-Sheet 2
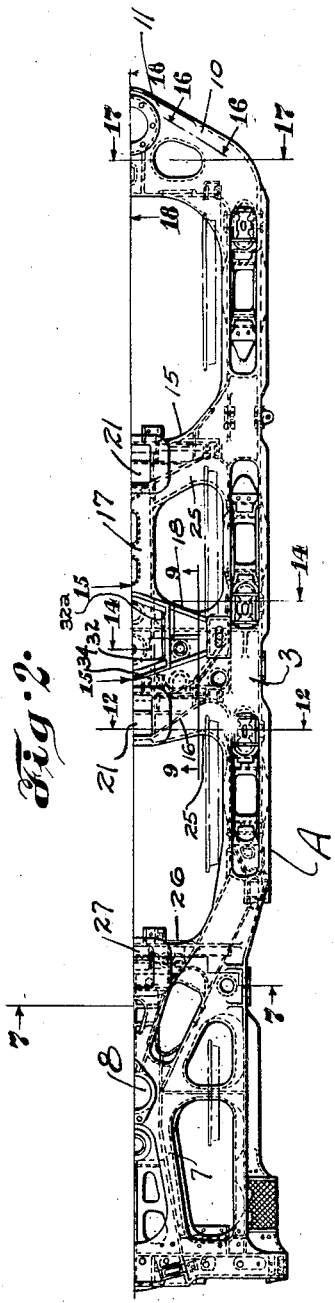
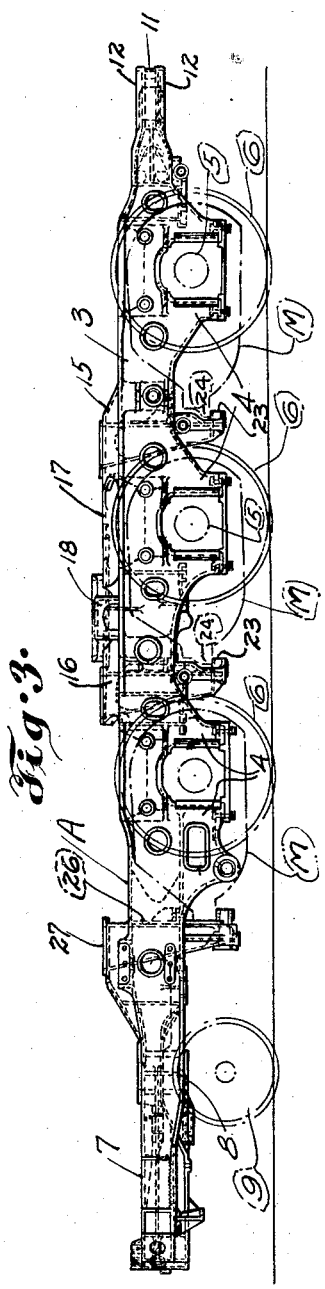
INVENTOR
William M. Sheehan
By Rodney Bedell
ATTORNEY June 24, 1930.  W. M. SHEEHAN  1,766,406
LOCOMOTIVE STRUCTURE
Filed Aug. 13, 1928  4 Sheets-Sheet 3
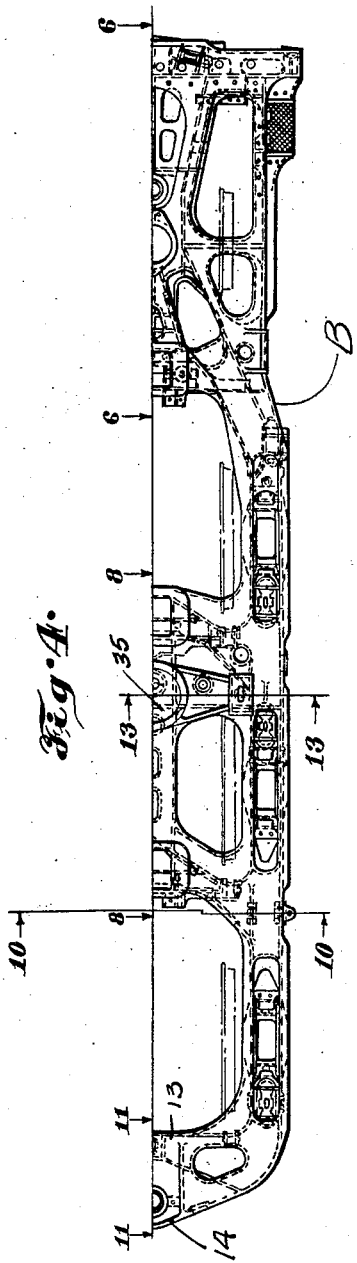
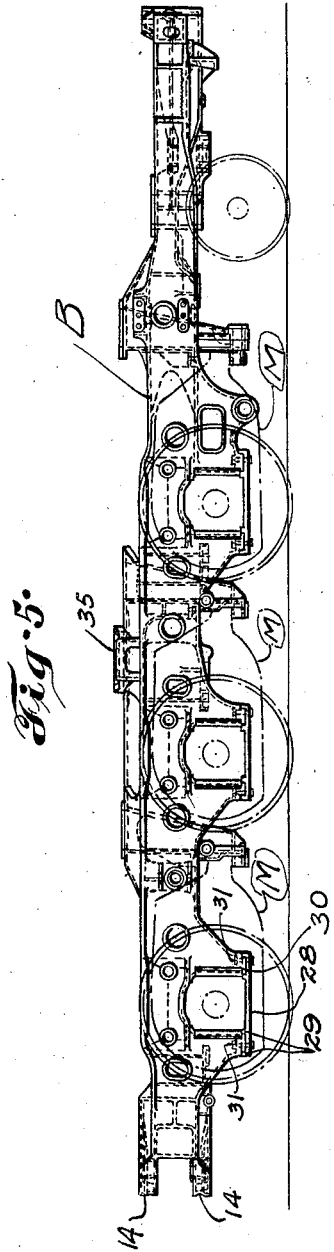
INVENTOR
William M. Sheehan
By Rodney Bedell
ATTORNEY June 24, 1930. W. M. SHEEHAN 1,766,406
LOCOMOTIVE STRUCTURE
Filed Aug. 13, 1928  4 Sheets-Sheet 4
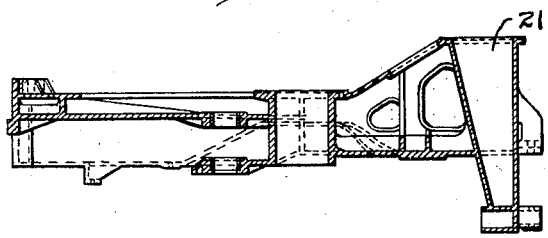
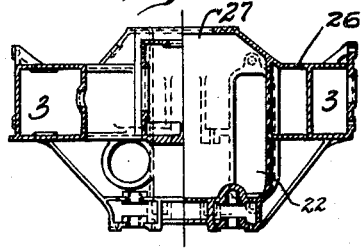
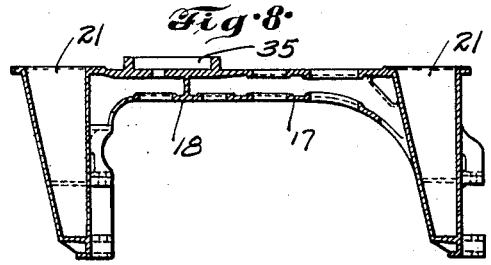
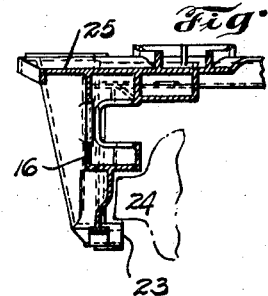
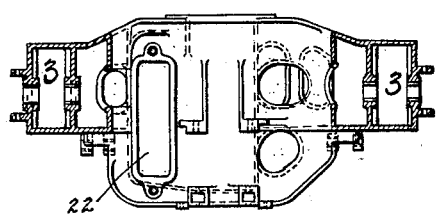
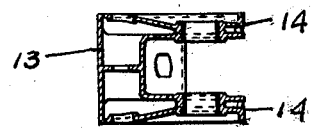
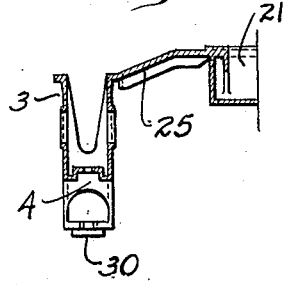
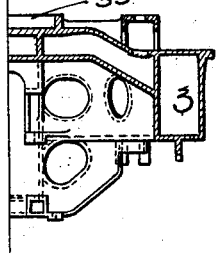
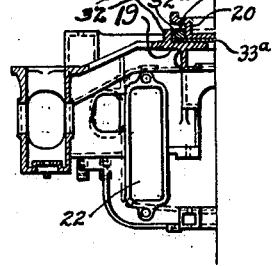
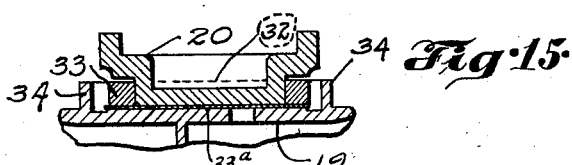
INVENTOR
William M. Sheehan
By Rodney Bedell
ATTORNEY Patented June 24, 1930

1,766,406

UNITED STATES PATENT OFFICE

WILLIAM M. SHEEHAN, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

LOCOMOTIVE STRUCTURE

Application filed August 13, 1928. Serial No. 299,331.

My invention relates to railway rolling stock and particularly to electric locomotives, and consists in a novel frame for use in locomotive bed or truck structure, and in the arrangement of associated structure.

In constructing such frames for locomotives of the greatly increased capacities now demanded, there are a number of problems arising from the necessity of providing sufficient strength to take care of the buffing and pulling forces and the superimposed loads and for accommodating the running gear, driving motors, etc. At the same time, the load limitations of track structure make it imperative that the weight of frame be kept as low as consistent with strength.

It is the general object of my invention to provide a structure which will solve a number of these problems.

One of the more particular objects of my invention has been to provide accessibility to the motors for the purposes of adjusting and renewing elements thereof and for assembling and disassembling the motors and their axles with the vehicle frames.

Another particular object of my invention has been to provide in an articulated locomotive, connecting structure between the articulated frames which will not only serve to transmit buffing and pulling forces but will also transfer vertical loads from one frame to the other under the conditions which occur due to track irregularities and at other times when the normal distribution of the load is disturbed.

Another object of my invention is to provide for adequate transfer of the superimposed load from a center plate to the sides of the frame, it being borne in mind that such transfer must be effected through transom members which must be arranged so as to accommodate the motors which lie in the same general horizontal plane as that occupied by the sides and by the transoms.

I also desire to utilize the transom members for conducting air currents from the superstructure to the motors.

Other more detailed objects of my invention will be apparent from the following specification and inspection of the accompanying drawings forming a part of the specification, and in which—

Figure 1 is a side elevation showing the general arrangement of articulated frames and a cab mounted thereon.

Figure 2 is a one-half longitudinal top view of one of the frames.

Figure 3 is a side elevation of the same.

Figure 4 is a one-half top view of the other of the frames.

Figure 5 is a side elevation of the same.

Figures 6, 8 and 11 are longitudinal vertical sections taken on the corresponding section lines of Figure 4.

Figures 7, 12, 14, 16 and 17 are vertical transverse sections taken on the corresponding section lines of Figure 2.

Figures 9, 15 and 18 are vertical longitudinal sections taken on the corresponding section lines of Figure 2.

Figures 10 and 13 are vertical transverse sections taken on the corresponding section lines of Figure 4.

Figure 19 is a one-half end elevation of the right-hand end of the frame shown in Figures 2 and 3.

The articulated frames will be designated as A and B, respectively, and each is provided with a center plate structure 1 and 2, respectively, upon which is mounted the superstructure or cab indicated generally at C.

The lefthand frame A is preferably formed of a one-piece casting and comprises side members 3, preferably of box-shape cross section, with downwardly extending portions 4 forming pedestal legs in which the axles 5 are journaled, which axles mount driving wheels 6. The outer or lefthand end of the frame A includes a deck 7 having a centrally located bearing 8 for journaling a swiveling truck, the wheels of which are indicated at 9.

The other end of frame A includes a cross tie 10 preferably of box-shape cross section, and having its outer intermediate portion 11 of reduced depth (see Figures 16 and 19) and provided with vertical reinforcing flanges 12 on the outer extremities of its horizontal walls. The portion 11 forms a tongue whereby frame A may be connected to the adjacent end of frame B, the side members of which are connected by a cross tie 13 of box-shape cross section having an outer intermediate portion forming two spaced jaws 14, each of box-shape cross section and substantially shallower in depth than the remainder of the crosstie. As will be apparent from Figure 1, there will be substantial vertical clearance between members 11 and 14 when the frames are assembled, and it will be understood that under normal conditions no vertical load is transferred between these members at this point. The members 11 and 14 serve to transmit longitudinal forces from one frame to the other. At a rail joint where one rail is higher than the other, there may be a transfer of vertical load from one frame due to the inclination of the frames relatively to each other and this condition may exist in the event of derailment, disarranged spring rigging, or under other similar abnormal conditions, in which case the box-shape section of the articulated joint members will enable the same to withstand the unusual vertical load.

Intermediate the side members and between the ends of each frame, I provide a novel transom and center plate supporting structure consisting preferably of two spaced transoms, having a longitudinal bridge connecting them, and a transverse member intermediate the transoms and united with the same and with said bridge. Because of the necessity of providing clearance for the motors M and wheels 6 and to provide sufficient width to the transoms, to afford increased strength, each end portion of the righthand transom 15 in frame A extends from the adjacent side member diagonally inwardly toward the left and then transversely of the frame to meet the corresponding opposite end portion of the transom. Preferably the transom is of box-shape cross section and the vertical walls of the transom merge with the inner walls of the side members by means of arcuate webs. The lefthand transom 16 is similarly arranged and a longitudinal bridge 17 of comparatively shallow depth connects transoms 15 and 16. A transverse bridge 18 is located intermediate transoms 15 and 16 and merges with bridge 17 at the center of the frame.

A center plate element is carried by that portion of the structure which is formed by bridge 18 near the center of the frame, see Figure 15, also see Figure 8 which illustrates frame B, but shows the frame members substantially the same as the corresponding members of frame A.

The shallow depth of bridges 17 and 18 provides adequate room beneath them for the motors M and at the same time the merging of the center plate supporting elements and the adjacent transom affords adequate support for the center plate load and resists the bending moment due to the center load.

The walls of the box shaped transoms 15 and 16 are utilized to form a conduit for receiving an air current received from the superstructure at the flanged opening 21 and delivered through suitable by-passes or ports 22 to the front of one of the adjacent motors M, cooling the latter in the usual manner. (See Figure 14.)

The righthand wall of each transom 15 and 16 is provided with integral shoulders 23 for supporting the nose lugs 24 on the motors.

The top wall of each transom extends to the left beyond the vertical walls as indicated at 25 (see Figure 9) and merges with the top wall of the side member, thus increasing the resistance of the body of the transom to distortion due to longitudinal forces.

The frame also includes a third transom portion 26 connecting the inwardly inclined portions of the side pieces and forming an air conduit having a flanged opening 27 and adapted to discharge a current of air to the lefthand motor M.

The transoms of each frame are substantially the same and the arrangement shown makes it possible to disconnect the motors from the frame and by the removal of fillers, such as are usually provided in the pedestals, the motors may be moved away from their supporting lugs and dropped, with their axles, from assembly with the frame. The wide upper walls of the transoms serve to resist the high longitudinal forces due to bringing to rest the heavy loads on the frames and in the cab. The structure eliminates the necessity for a large longitudinal member rigidly fastened to the tops of transoms on center line for the length of the truck, such as has been previously used and which takes up much of the space which is badly needed for inspection and work on the motors.

The center plate support 19 formed on frame A includes upstanding side flanges 32 (which are straight and parallel) and end flanges 34 which are inclined towards each other and are connected by arcuate elements. Flanges 32 are provided with liners $32^a$. A ring member 33 (see Figures 14 and 15) has straight sides fitting between liners $32^a$ and has end portions corresponding to the contour of the opposite flanges 34 but having some play between flanges 34. A liner $33^a$ is provided between the center plate 20 and support 19. This arrangement permits member 33 to move back and forth longitudinally of the frame a slight distance to accommodate variations in the distance between the center plates on the two frames such as will be produced when the locomotive is rounding a curve.

The center plate structure at 35 on frame B will be of the usual circular type as it is unnecessary to provide for relatively longitudinal movement on both trucks.

To more effectively tie the lower ends of adjacent pedestal legs together, I have provided each pedestal with a tie bar 28 provided with upstanding lugs 29 adapted to embrace opposite sides of toes 30 formed on the lower ends of the pedestal legs. The tie bars are held in assembled position by suitable bolts 31, preferably two such bolts transversely located being extended through each end of the tie bar and the adjacent pedestal toe.

It will be understood that I have described a preferred embodiment of my invention but that many of the features originated by me may be utilized without necessarily including all of the other features described and all of the structure described may be modified substantially without departing from the spirit of my invention, and I contemplate the exclusive use of all such embodiments of my invention as come within the scope of my claims.

I claim:

1. In a frame of the class described, side members, and a motor supporting transom extending diagonally of said members being of deeper section intermediate its ends than the depth of said side members and connecting the same and adapted to support a center plate.

2. In a frame of the class described, side members, and a motor supporting transom having spaced vertical walls extending from end to end of the transom and extending diagonally of said members and connecting the same.

3. In a frame of the class described, side members, and a motor supporting transom extending diagonally of said members and connecting the same and being of greater depth at the longitudinal center line of the frame than at the connections to said members, the top of the intermediate portion of said transom being at higher level than said side members and a center plate supported by said portion.

4. In a frame of the class described, side members, and a motor supporting transom extending diagonally of said members and connecting the same and being of box shape cross section with its vertical walls extending from end to end of the transom and being of greater depth at the longitudinal center line of the frame than at the connections to said members.

5. In a frame of the class described, side members, spaced transoms extending diagonally of said members and connecting the same, a transverse member connecting said side members between said transoms and connected to at least one of said transoms intermediate its ends, and a center plate element on said transverse member.

6. In a frame of the class described, side members, spaced transoms extending diagonally of said members and connecting the same, a transverse member connecting said side members between said transoms, a longitudinal member intermediate said side members and connecting said transoms and said transverse member, and a center plate element on said transverse member.

7. In a frame of the class described, side members of box shape cross section, transoms of box shape cross section extending diagonally of said side members and connecting the same, a transverse member connecting said side members between said transoms, a longitudinal member of box shape cross section intermediate said side members and connecting said transoms and said transverse member, and a center plate element on said transverse member.

8. In a frame of the class described, side members, spaced transoms extending diagonally of said members and connecting the same, and a longitudinal member connecting said transoms along the center line of the frame and adapted to support a center plate.

9. In a frame of the class described, side members of box shape cross section, and a transom of similar cross section extending diagonally of said members and connecting the same and having its narrowest part intermediate the longitudinal center line of the frame and the connections to said members.

10. In an integral frame of the class described, side members, and a transom connecting said members and extending inwardly therefrom diagonally of the frame, the center portion of said transom extending transversely of the frame.

11. In an integral frame of the class described, side members, and a transom of box shape cross section connecting said members and extending inwardly therefrom diagonally of the frame, the center portion of said transom extending transversely of the frame.

12. In an integral frame of the class described, side members of box shape cross section, and a transom of box shape cross section connecting said members and extending inwardly therefrom diagonally of the frame, the center portion of said transom extending transversely of the frame.

13. In a frame of the class described, side members, a transom member extending diagonally of the frame from each of said members toward the longitudinal center line of the frame, and a transverse member connecting said members at points adjacent to the intersection of said transom members with said side members.

14. In a frame of the class described, spaced side members, a transom comprising members extending diagonally inwardly from said side members and towards each other, a transverse member extending between said side members at the outer ends of said transom members, said side members and transom members forming a triangle-like structure, there being a connection between said transom members and said transverse member at the center of the frame, and a center plate support element at said connection.

15. In a frame of the class described, spaced side members, a transom comprising members extending diagonally inwardly from said side members and towards each other, a transverse member extending between said side members at the outer ends of said transom members, said transverse member being of relatively shallow depth and said diagonal transom members being of relatively greater depth, there being a connection between said transom members and said transverse member at the center of the frame, and a center plate support element at said connection.

16. In a frame of the class described, side members, spaced transoms connecting the same, a longitudinal member connecting said transoms intermediate their ends, a transverse member between said transoms connecting said side members and merging with said longitudinal member, and a center plate carried by said longitudinal and transverse members at their intersection.

17. In a frame of the class described, side members, spaced transoms connecting the same, a longitudinal member of relatively shallow section connecting said transoms intermediate their ends, a transverse member of relatively shallow section connecting said side members and intersecting said longitudinal member, and a center plate element carried by said longitudinal and transverse members at their intersection.

18. In a frame for an electric locomotive, a transom disposed diagonally of the frame forming an air conduit and having inlet and outlet openings for an air current supplied to a locomotive motor.

19. In a frame for an electric locomotive, a transom of box shape cross section disposed diagonally of the frame, the walls of said transom forming an air conduit, there being an air inlet opening in the top wall and an air outlet opening in the side wall for an air current supplied to a locomotive motor.

20. In a frame of the class described, side members each having spaced vertical walls, and a transom connecting said side members and including spaced vertical walls extending diagonally of said members and merging with the inner walls thereof, a portion of said transom walls extending transversely of said members.

21. In a frame of the class described, wheel pieces each having spaced vertical walls, and a transom connecting said wheel pieces and including spaced vertical walls at least one of said walls extending diagonally of said wheel pieces and merging with the inner walls thereof, a portion of said transom wall extending transversely of said wheel pieces.

22. In a frame of the class described, wheel pieces each having spaced vertical walls, a transom connecting said wheel pieces and including spaced vertical walls at least one of said walls extending diagonally of said wheel pieces and merging with the inner walls thereof, a portion of said transom wall extending transversely of said wheel pieces, and a motor nose supporting lug on said wall and spaced longitudinally of the frame from the ends of said transom.

23. In a frame of the class described, wheel pieces each having spaced vertical walls, a transom connecting said wheel pieces and including spaced vertical walls at least one of said walls extending diagonally of said wheel pieces and merging with the inner walls thereof, a portion of said transom wall extending transversely of said wheel pieces, and a center plate support on said wall and spaced from said side members.

24. In a frame of the class described, wheel pieces each having spaced vertical walls, a transom connecting said wheel pieces and including spaced vertical walls at least one of said walls extending diagonally of said wheel pieces and merging with the inner walls thereof, a portion of said transom wall extending transversely of said wheel pieces, and a motor nose supporting lug and a center plate support on said wall and spaced thereby longitudinally of the frame from the ends of said transom.

25. In a frame of the class described, side members having pedestals for the journal boxes of an axle, a transom extending diagonally of the frame inwardly from said side members adjacent to said pedestals and longitudinally of the frame away from said pedestals, and an element on said transom for supporting the nose of a motor mounted on said axle.

26. In a frame of the class described, side members having pedestals for the journal boxes of an axle, a transom extending diagonally of the frame inwardly from said side members adjacent to said pedestals and longitudinally of the frame away from said pedestals, and an element on said transom for supporting the nose of a motor mounted on said axle, said transom including a conduit for delivering an air current from the superstructure to said motor.

27. In a frame of the class described, side members having pedestals for the journal boxes of an axle, a transom extending diagonally of the frame inwardly from said members adjacent to said pedestals and longitudinally of the frame away from said pedestals, an element on said transom for supporting the nose of a motor mounted on said axle, and a member extending longitudinally of the frame from said transom and adapted to support a center plate.

28. In a frame of the class described, side members having pedestals for the journal boxes of an axle, a transom extending diagonally of the frame inwardly from said members adjacent to said pedestals and longitudinally of the frame away from said pedestals, an element on said transom for supporting the nose of a motor mounted on said axle, and a transverse member connecting said members adjacent to the connections thereto of said transom, said transverse member being adapted to support a center plate.

29. In a frame of the class described, side members having pedestals for the journal boxes of an axle, a transom extending diagonally of the frame inwardly from said members adjacent to said pedestals and longitudinally of the frame away from said pedestals, an element on said transom for supporting the nose of a motor mounted on said axle, and a transverse member connecting said side members adjacent to the connections thereto of said transom, said transverse member being connected to said transom and being adapted to support a center plate.

30. In a frame of the class described, side members having longitudinally spaced pedestals for mounting the journal boxes of spaced axles, transoms extending diagonally of the frame inwardly from said members adjacent to said pedestals and longitudinally of the frame away from said pedestals, and elements on said transoms for supporting the noses of respective motors mounted on said axles, and a longitudinally disposed member connecting the intermediate portions of said transoms and adapted to support a center plate.

31. In a frame of the class described, side members having longitudinally spaced pedestals for mounting the journal boxes of spaced axles, transoms extending diagonally of the frame inwardly from said members adjacent to said pedestals and longitudinally of the frame away from said pedestals, elements on said transoms for supporting the noses of respective motors mounted on said axles, a longitudinally disposed member connecting the intermediate portions of said transoms, and a transverse member connecting said side members between said transoms and intersecting with said longitudinal member, said longitudinal member and said transverse member being adapted to support a center plate at their intersection.

32. In a truck, a one piece transom having a center plate supporting member, there being integrally formed vertical surfaces adjacent to said member, said surfaces being disposed to accommodate relative movement of a center plate element in a direction longitudinally of the truck and to prevent relative movement of said element in direction transversely of the frame.

33. A one piece transom having a center plate supporting member, integral upright flanges about said member, side flanges extending in straight lines at the sides of said member and in curved lines at the ends of said member and adapted to accommodate longitudinal and swiveling movements of a center plate mounted on said member and to prevent transverse movement of said center plate.

34. A frame of the class described having side members, and an end cross tie connecting said members and formed of box shape cross section with a central and outer portion of relatively shallow depth and having reinforcing flanges above and below its horizontal walls.

35. In a railway vehicle structure, articulated frames arranged end to end with individual end cross ties of box shape cross section provided with tongue and pocket elements, respectively.

36. In a railway vehicle structure, articulated frames arranged end to end with individual end cross ties, one of said cross ties having a central tongue member of box shape cross section and the other of said cross ties having vertically spaced jaw members of box-shape cross section adapted to receive said tongue between them.

37. A frame of the class described having side members and an end cross tie connecting said members and formed of box shape cross section with a central and outer portion of relatively shallow depth and having reinforcing flanges above and below the outer extremities of the central portion of its horizontal walls.

38. In a railway vehicle structure, articulated frames arranged end to end with individual end cross ties, one of said cross ties having a central tongue member of box shape cross section and the other of said cross ties having vertically spaced jaw members of box shape cross section adapted to receive said tongue between them, said members serving to transmit longitudinal forces and vertical loads between said frames, each of said members having reinforcing vertical flanges on the outer edges of their horizontal walls.

39. A frame of the class described including side members, transom members extending diagonally of said side members and united intermediate said side members and adapted to support superstructure load, and a motor nose support on one of said transom members, all of said members being cast integrally with each other.

40. A frame of the class described including side members, pedestal members on said side members, transom members extending diagonally from said side members adjacent to said pedestal members and united intermediate said side members and adapted to support superstructure load, and a motor nose support member on one of said transom members, all of said members being cast integrally with each other.

41. A one piece casting comprising frame side members of box shape cross section and a transom member of similar cross section extending diagonally of said side members and connecting the same.

42. A one piece casting comprising frame side members of box shape cross section and a transom member of similar cross section having one of its walls extending diagonally of said side members and connecting the same.

43. A one piece casting comprising frame side members of box shape cross section and a transom member of similar cross section having one of its walls extending diagonally of said side members and connecting the same, and a motor nose support integral with said wall.

44. A one piece casting comprising frame side members of box shape cross section, transoms of box shape cross section extending diagonally of said side members and connecting the same, a transverse member connecting said side members between said transoms, a longitudinal member of box shape cross section located intermediate said side members and connecting said transoms and said transverse member, and a center plate element on said transverse member.

45. A one piece casting comprising frame side members of box shape cross section, and a transom of similar cross section extending diagonally of said side members and connecting the same and being of substantially greater width at the longitudinal center line of the frame than at the connections to said side members.

46. A one piece casting comprising frame side members and a transom of box shape cross section connecting said side members and extending inwardly therefrom diagonally of the same, the center portion of said transom extending transversely of the frame and forming an air conduit.

47. A one piece casting comprising frame side members of box shape cross section and a transom of box shape cross section connecting said side members and extending inwardly therefrom diagonally of the same, the center portion of said transom extending transversely of the frame and forming an air conduit.

48. A one piece casting comprising frame side members, pedestals for the journal boxes of an axle, a transom extending diagonally of said side members from points adjacent said pedestals, a motor nose support on said transom, said transom including a conduit for delivering an air current from superstructure to a motor supported by said element.

49. In an electric locomotive, a frame with side members, pedestals, an axle journaled therein, a motor mounted on said axle, a transom extending diagonally of the frame from said side members adjacent to said pedestals and supporting the nose of said motor intermediate said members at a point spaced longitudinally of the frame from said pedestal.

50. In an electric locomotive, a frame having side members, pedestals, an axle journaled therein, a motor mounted on said axle, a transom extending diagonally of the frame from said side members adjacent to said pedestals and supporting the nose of said motor intermediate said side members at a point spaced longitudinally of the frame from said pedestal, and a relatively shallow transverse member connecting said side members and extending over the nose of said motor.

51. In an electrode locomotive, a frame having side members, pedestals, an axle journaled therein, wheels on said axle, a motor on said axle, a transom having spaced walls forming a conduit for delivering air to the front of said motor, said walls extending diagonally of the frame to connect with said wheel pieces at points nearer to said axle than the front of said motor.

52. In an electric locomotive, a frame having side members, pedestals, an axle journaled therein, wheels on said axle, a motor on said axle, a transom having a side wall extending diagonally of the frame to connect with said wheel pieces at points nearer to said axle than the front of said motor.

53. In an electric locomotive, a frame having side members, an axle, a motor mounted on said axle, a transom extending diagonally of the frame from said side members and supporting the front end of said motor, the connection of said transom with said side members being located nearer to said axle than the portion of said transom which supports said motor.

54. In an electric locomotive, a frame having side members, pedestals, an axle journaled therein, wheels on said axle, and a transom having a side wall extending inwardly from said side members so as to clear said wheels and then extending diagonally of the frame to a point nearer to said axle than the rims of said wheels.

55. In an electric locomotive, a frame having side members, spaced axles, pedestals on said side members for said axles, wheels on said axles, and a transom extending diagonally of the frame from said side members at points between adjacent wheels and then extending transversely of the frame intermediate said side members at a point nearer to one of said axles than to the other.

56. In an electric locomotive, a frame having a transom disposed diagonally of the frame, said transom forming an air conduit for air currents supplied to the motor from the super-structure, said conduit provided with an inlet opening on top of said transom and an outlet opening in the vertical web of said transom and adjacent to the air receiving side of said motor.

57. In a locomotive, a series of axles, an individual motor mounted on each axle, a one piece casting having side members, members on opposite sides of one of said motors and integral with and connecting said side members, each of said connecting members also supporting a respective one of said motors, and an individual air conduit formed integral with each of said connecting members and including a by-pass to the corresponding motor.

58. In a one piece frame for an electric locomotive, side members arranged to accommodate a series of axles, a series of spaced members integral with and connecting said side members and arranged to accommodate a motor between them, each of said connecting members being adapted to partly support a motor mounted on one of said axles, and an individual air conduit formed integral with each of said connecting members and including a by-pass to the corresponding motor.

59. In a frame of the class described, side members and a motor supporting transom extending diagonally of said side members with its intermediate portions extending above and below the level of said side members.

60. In a frame of the class described, side members of relatively shallow section and a transom extending diagonally of said members and being of relatively deeper section and provided with a motor nose member element and with an air conduit opening at one side of said support.

In testimony whereof I hereunto affix my signature this 6th day of Aug., 1928.

WILLIAM M. SHEEHAN.